US008050268B2

(12) United States Patent
Kouhsari et al.

(10) Patent No.: US 8,050,268 B2
(45) Date of Patent: Nov. 1, 2011

(54) METHODS AND APPARATUS FOR IP MANAGEMENT TRAFFIC CONSOLIDATION

(75) Inventors: Thomas Kouhsari, Arlington, VA (US); James Thomas Menzies, Montgomery Village, MD (US); Scott Robinson, Rockville, MD (US)

(73) Assignee: Fluke Corporation, Everett, WA (US)

( * ) Notice: Subject to any disclaimer, the term of this patent is extended or adjusted under 35 U.S.C. 154(b) by 380 days.

(21) Appl. No.: 11/736,370

(22) Filed: Apr. 17, 2007

(65) Prior Publication Data

US 2007/0245011 A1 Oct. 18, 2007

Related U.S. Application Data

(60) Provisional application No. 60/792,607, filed on Apr. 18, 2006.

(51) Int. Cl.
*H04L 12/28* (2006.01)
*H04L 12/56* (2006.01)
*G06F 15/173* (2006.01)
*G06F 15/16* (2006.01)

(52) U.S. Cl. .................. 370/392; 709/238; 709/245

(58) Field of Classification Search .................. None
See application file for complete search history.

(56) References Cited

U.S. PATENT DOCUMENTS

| 5,651,006 | A  | * | 7/1997  | Fujino et al. ............ 370/408 |
| 6,725,264 | B1 | * | 4/2004  | Christy ............... 709/225 |
| 7,315,888 | B2 | * | 1/2008  | Shibata ............... 709/223 |
| 2004/0044758 | A1 | * | 3/2004 | Palmer et al. ........... 709/223 |
| 2004/0090919 | A1 | * | 5/2004 | Callon et al. ........... 370/237 |
| 2004/0177136 | A1 | * | 9/2004 | Chen et al. ............. 709/223 |
| 2004/0199619 | A1 | * | 10/2004 | Jai et al. .............. 709/223 |
| 2005/0271047 | A1 | * | 12/2005 | Huonder et al. .......... 370/389 |
| 2006/0092931 | A1 | * | 5/2006 | Walter et al. ........... 370/389 |
| 2006/0274741 | A1 | * | 12/2006 | Wing et al. ............ 370/389 |
| 2008/0098103 | A1 | * | 4/2008 | Packiam ............... 709/223 |
| 2008/0270584 | A1 | * | 10/2008 | Liu .................. 709/223 |

FOREIGN PATENT DOCUMENTS

WO 0139435 A2 5/2001

OTHER PUBLICATIONS

Visual Networks, Visual UpTime, Managing Inband Traffic, Part No. 508-0016, Revision 100, Supports Visual UpTime version 5.2, Oct. 2000, XP-002443649.

* cited by examiner

*Primary Examiner* — Chirag Shah
*Assistant Examiner* — Suk Jin Kang
(74) *Attorney, Agent, or Firm* — Edell, Shapiro & Finnan, LLC

(57) ABSTRACT

Consolidation of management traffic is performed in a network by employing a gateway network management device (NMD) to route management messages between a controller and NMDs located at sites in the network. Management addresses are assigned to components of a network management system, including the management controller and NMDs. The management addresses are distinct from customer addresses associated with equipment located at the sites. These customer addresses can serve as piggyback addresses for routing encapsulated management messages through the network. Management messages from the management controller contain the management address of the destination NMD and are first sent to the gateway NMD. The gateway NMD looks up the piggyback address corresponding to the destination management address and generates an encapsulated management message containing the management message and the piggyback address. Using the piggyback address, the encapsulated message is then routed through the network to the destination NMD.

28 Claims, 6 Drawing Sheets

METHODS AND APPARATUS FOR IP MANAGEMENT TRAFFIC CONSOLIDATION

CROSS REFERENCE TO RELATED APPLICATIONS

This application claims priority under 35 U.S.C. §119(e) to U.S. Provisional Application No. 60/792,607, filed Apr. 18, 2006, the disclosure of which is hereby incorporated by reference in its entirety.

FIELD OF THE INVENTION

The present invention relates to methods and apparatus for IP management traffic consolidation.

BACKGROUND

Service providers have historically managed their networks by placing network management devices at key points in the network. These network management devices monitor network performance and communicate information to back-end network operations centers for troubleshooting and corrective action. In the past, Frame Relay and Asynchronous Transfer Mode (ATM) networks provided a capability to provision a management overlay network especially well suited for communication with network management devices. By configuring permanent virtual circuits (PVCs), communication routes could be deployed for reliable communication independent of customer network traffic.

Several factors have eroded the value of the aforementioned approach, including the growth of Internet protocol (IP) and multi protocol label switching (MPLS) networks with mixes of underlying Frame Relay or ATM networks, and the growth of heterogeneous environments where an enterprise is served by multiple service providers. The nature of modem IP and MPLS networks makes configuring "circuit" based point-to-point connectivity extremely difficult if not impossible. These are "mesh" networks by their nature. Even where possible, the heterogeneous environments make configuring and maintaining PVCs prohibitively expensive.

From a network management standpoint, in an MPLS network, ideally one service provider would provide the access for an entire enterprise. This approach would allow the service provider to use an overlay management network to communicate with all of the network management devices on the enterprise's network. However, this scenario is generally the exception rather than the rule. One usually finds that an enterprise network is served by multiple service providers and local exchange carriers (LECs), with one main provider or LEC providing the network management and service level agreement (SLA) guarantees. Additionally, while from the customer's viewpoint, MPLS is being used, the underlying access could be Frame Relay, ATM, point-to-point protocol (PPP), etc.

In such scenarios, setting up the management connections to network management devices can make a rollout of a network management system cost prohibitive. For network management devices connected to a service provider's or LEC's Frame Relay or ATM networks, PVCs must be provisioned, configured, and paid for (as this would be two separate groups in any service provider or LEC) in order to access the network management device. Network management devices that are connected to a competing service provider's or LEC's network are even more difficult to manage. In this case, the main service provider or LEC would have to provision, configure, and pay for access to the competing network (from a second group within its own organization), then buy PVCs to each network management device connected to the competing network from the competing service provider or LEC.

Often, service provider and LEC customers are not willing to endure the cost and time associated with setting up management access to management devices in these types of scenarios. Therefore, a solution is needed that will make such deployments much less costly and much easier to access and manage.

SUMMARY

The invention generally relates to a scheme that provides a mechanism to route management traffic reliably across multiple server providers as well as multiple IP address spaces (i.e., service provider and enterprise) in an extremely cost efficient manner.

In accordance with one aspect of the invention, management addresses are assigned to components of a network management system that monitors performance of the network. The network management system includes a management controller and a plurality of network management devices (NMDs) located at a various sites. The management addresses are distinct from customer addresses associated with equipment located at the sites.

Network management messages are routed over a network between the management controller and the NMDs using a piggyback addressing scheme in which a gateway NMD is used to route network management traffic between the management controller and the NMDs. Specifically, when the management controller wishes to communicate with one of the NMDs, the management controller generates a network management message (e.g., a SNMP packet) that contains the source and destination management addresses of the message. These management addresses are recognizable to the NMDs and the management controller.

The management controller sends the network management message to the gateway NMD over a management channel, rather than directly to the destination NMD. Upon receiving the network management message, the gateway NMD identifies a piggyback address that corresponds to the destination management address contained in the message. The piggyback addresses can be customer IP addresses that are useable for routing messages through the IP/MPLS network. For example, a management address associated with a particular NMD has a corresponding piggyback address that can be a customer IP address of equipment (e.g., a customer edge router) co-located with the NMD and can be used to route messages to the NMD's location via the network. The correspondence between piggyback and management addresses can be stored in a table that is periodically updated, for example. The gateway NMD encapsulates the network management message received from the management controller, wherein the encapsulation includes the piggyback customer IP address.

The encapsulated message, which can be any number of methods such as generic routing encapsulation (GRE) or transmission control protocol (TCP), is then routed through the network to the location of the piggyback address. The NMD at that location intercepts the encapsulated message, identifies the destination management address contained therein, and processes the contents of the message. The NMD can send a reply message by encapsulating the reply message. In this case, the destination piggyback address is the customer IP address that corresponds to the location of the gateway NMD, and the encapsulated destination management address is that of the management controller. The reply message is routed through the network to the location of the gateway NMD using the piggyback address. The gateway NMD intercepts the encapsulated reply message, strips off the encapsulation, and sends the un-encapsulated reply message to the management controller via the management channel. By routing network management traffic through a gateway NMD in this manner using piggyback addressing, management traffic can be reliably routed across multiple server providers as well as multiple IP address spaces in an efficient manner.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
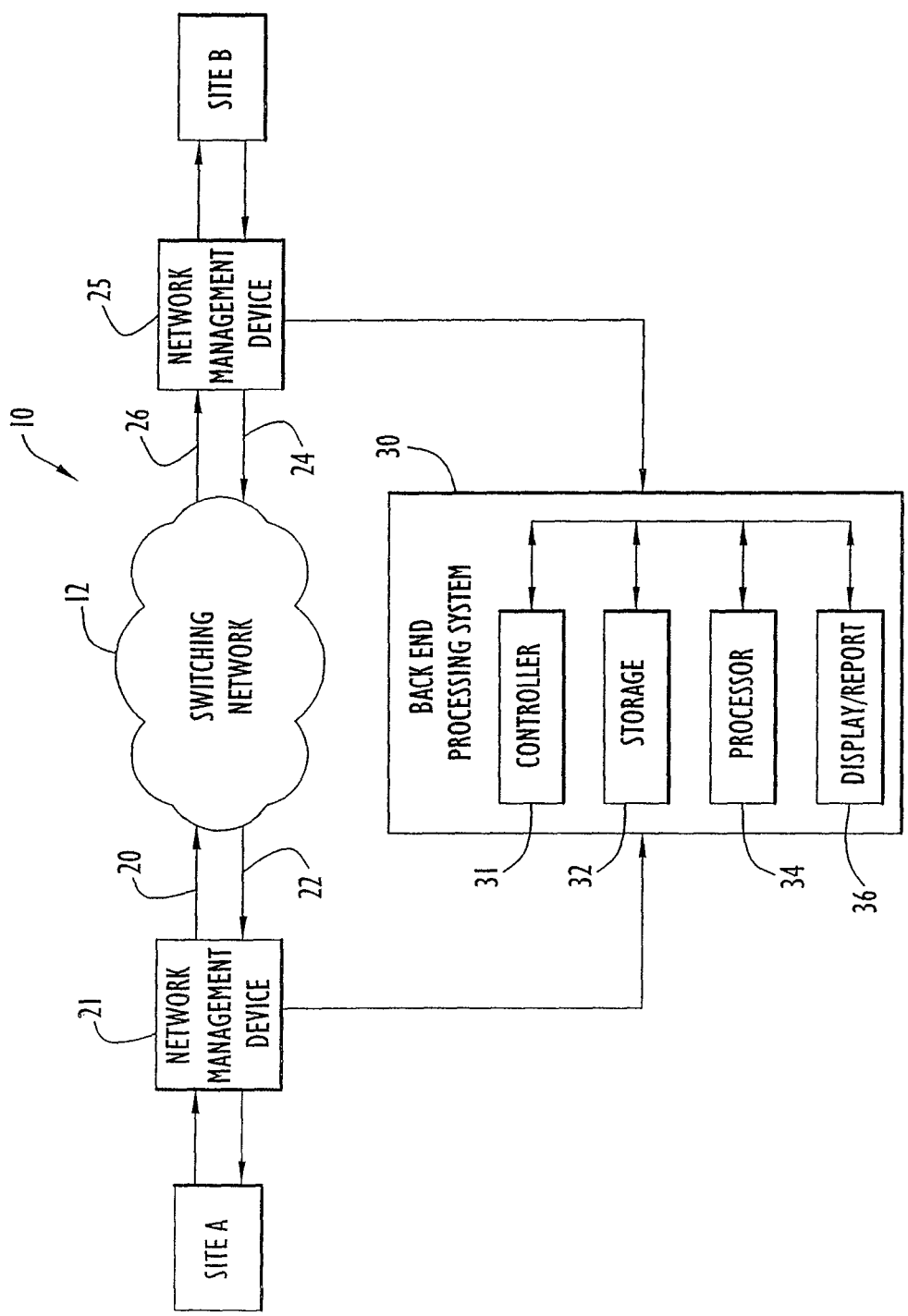
FIG. 1 is a block diagram of a network environment in which the techniques of the present invention may be employed.

The following detailed explanations of FIGS. 1-9 and of the exemplary embodiments reveal the methods and apparatus of the present invention. FIG. 1 illustrates, at a very general level, a data transmission system (communication network) that includes a network management system for monitoring performance of the network. As shown in FIG. 1, an exemplary data transmission system 10 includes a number of sites, including sites A and B, and a switching network 12 to facilitate communications between the sites. The network management system essentially includes a number of network management devices (NMDs) 21, 25 located throughout the network, which monitor network activity and collect network performance data, and at least one back-end processing system 30 that coordinates and controls the system, collects and processes measurement data received from the network management devices, monitors and analyzes network performance, and notifies network operators when performance problems are detected. Such a network management system can provide, for example: accurate and reliable measurement of performance metrics such as network latency, jitter, and throughput; management of user performance requirements with configurable sensitivity; a context-sensitive data repository which enables the assessment and evaluation of network performance with respect to circuit, time, bandwidth and performance requirements; and/or forecasting of potential or developing network performance problems.

In the general example shown in FIG. 1, the data transmission system 10 can include conventional communications line types, for example, T3, OC-3, North American T1 (1.544 Mbits/second), CCITT (variable rate), 56K or 64K North American Digital Dataphone Service (DDS), Ethernet, and a variety of data communications connections, such as V.35, RS-449, EIA 530, X.21 and RS-232. Sites A and B are each capable of transmitting and receiving data packets in various protocols utilized by the communication lines, such as Asynchronous Transfer Mode (ATM), Frame Relay, High Level Data Link Control (HDLC) and X.25, IP, MPLS, Ethernet, etc. Each line 20, 22, 24, 26 represents a respective transmission direction as indicated by the arrows. For example, the arrows on communication lines 20 and 22 represent transmissions from site A to the network and from the network to site A, respectively, while the arrows on communication lines 24 and 26 represent transmissions from site B to the network and from the network to site B, respectively.

Referring again to FIG. 1, site A is connected to the network by communication lines 20 and 22, which are accessible to the first network management device 21, and site B is connected to the network by communication lines 24 and 26, which are accessible to the second network management device 25. As used herein the terms "data network," "switching network," "network," etc. refer to networks that carry virtually any kind of information and are not limited to any particular type of hardware, technology, protocol, application, or data (audio, video, digital data, telephony, etc.).

Site A and site B utilize switching network 12 to communicate with each other, wherein each site is connected to switching network 12 that provides paths between the sites. For illustrative purposes, only two sites (A and B) are shown in FIG. 1. However, it will be understood that the data communication system can include numerous sites, wherein each site is generally connected to multiple other sites over corresponding transmission circuits within the switching network. Likewise, network management devices may be positioned at various points throughout the system, including endpoints associated with particular sites (as shown in FIG. 1) or at intermediate points in the switching network.

Each of sites A and B can include, for example, one or more local area networks (LANs). Routers (not shown in FIG. 1) can interconnect the local site LANs ultimately to a wide area network (WAN), represented by the switching network cloud 12 in FIG. 1.

As shown in FIG. 1, network management devices (NMDs) 21 and 25 are respectively disposed between switching network 12 and sites A and B. Network management devices 21 and 25 can be located at sites A and B, at any point between switching network 12 and sites A and B, or at points within the switching network itself. The placement of the NMDs depends at least in part on the portion of the system or network over which a network service provider or other party wishes to monitor performance of data traffic flow. The NMDs can be disposed throughout the network and connected at a variety of points in the network environment 10. In general, network management devices can be placed at virtually any point in the network or any point within an enterprise LAN. For example, NMDs can be connected to a local router such that the NMD is not in-line with the data flow path through the router between the LAN(s) and the WAN. NMDs can also be connected in-line between a local router and a customer edge router (CER), or in-line between a CER and the WAN, for example.

The NMDs can be any type of monitoring device or probe and can comprise standalone hardware/software devices or software and/or hardware added to network equipment such as PCs, routers, CSU/DSUs (channel service unit/data service unit), FRADS, voice switches, phones, etc. Software embedded in the network management devices can collect network performance data for detailed analysis and report generation relating to any of a variety of performance metrics. By way of a non-limiting example, an NMD can be a CSU/DSU that operates both as standard CSU/DSU and as a managed device capable of monitoring and inserting network management traffic; an inline device residing between a DSU and router, which monitors network traffic and inserts network management traffic; or a passive monitoring device that monitors network traffic only. The NMDs are "active" monitoring devices capable of inserting test packets or messages into the data traffic.

The NMDs can collect measurement data relating to any of a variety of performance metrics associated with operation of the network including, but not limited to latency, jitter, and throughput. It will be understood that the invention is not limited to the measurement or analysis of any particular performance metric or any particular combination of metrics.

The backend processing system 30 of the network management system shown in FIG. 1 receives measurement data either directly or indirectly from the network management devices, and collects and stores measurement data and processes the data to produce the various displays and reports required to monitor performance of the network and its components. The architecture depicted in FIG. 1 is a conceptual diagram illustrating major functional units and does not necessarily illustrate physical relationships or specific physical devices within the backend processing system or between the backend processing system and the network management devices. The configuration and components of the backend processing system can take many forms and are described herein only in general terms for context. Those skilled in the art will appreciate that the techniques described herein for communicating within a network management are applicable regardless of the particular architecture of the backend processing system or network management devices.

Backend processing system 30 includes a controller module 31 responsible for coordinating and controlling the network management system. For example, controller 31 may be responsible for sending instructions to the various network management devices and periodically polling the network management devices to collect measured data. A data storage capability of the backend processing system is represented by storage module 32 for storing measurement data as well as information generated by processing measurement data, such as aggregated report data, analysis results, and historical information. Processing system 30 further includes a management and processing capability represented in FIG. 1 by processor module 34, which performs various processing tasks, such as performing operations on raw measurement data to produce reports and performing analysis operations. The backend processing system 30 further includes a display, interface, and report capability represented by display/report module 36, which displays performance information in a tabular or graphical manner via an interactive graphical user interface, for example, and preferably includes the capability to generate various performance reports.

The backend processing system may receive measurement data directly from the NMDs or may receive measurement data indirectly (e.g., the network management devices may supply measurement data to a storage device at the local site, which is subsequently supplied to the backend processing system. Further, the backend processing system may be located at a single site or may have components distributed throughout the network at multiple locations. For example, storage module 32 may constitute storage capabilities at a number of local sites as well as a storage capability at one or more backend processing sites. Likewise, various backend processing tasks, nominally represented by processor 34 in FIG. 1, may be performed by a number of different processors that carry out specific task and that may be distributed throughout the network. Similarly, the display/reporting capability may allow access to performance information via interfaces at a number of sites or via a web-based interface accessible to authorized customers or service provider personnel.

In networks based on protocols such as Frame Relay or ATM, multi-protocol NMDs can support a management traffic consolidation (MTC) feature, whereby a certain NMD acts as a management gateway for a group of other network management devices in the network. Thus, in Frame Relay and ATM enterprise networks, management traffic consolidation (MTC) can be used to avoid the need for service providers to provision a separate data link connection identifier (DLCI) for each network management device. This allows the service provider to provision one DLCI to a head-end site to communicate with the head-end NMD. All communications with other sites would then go through the same DLCI to the head-end site, where the head-end network management system would use special routing functionality to forward communications to the remote sites.

Figure 2:
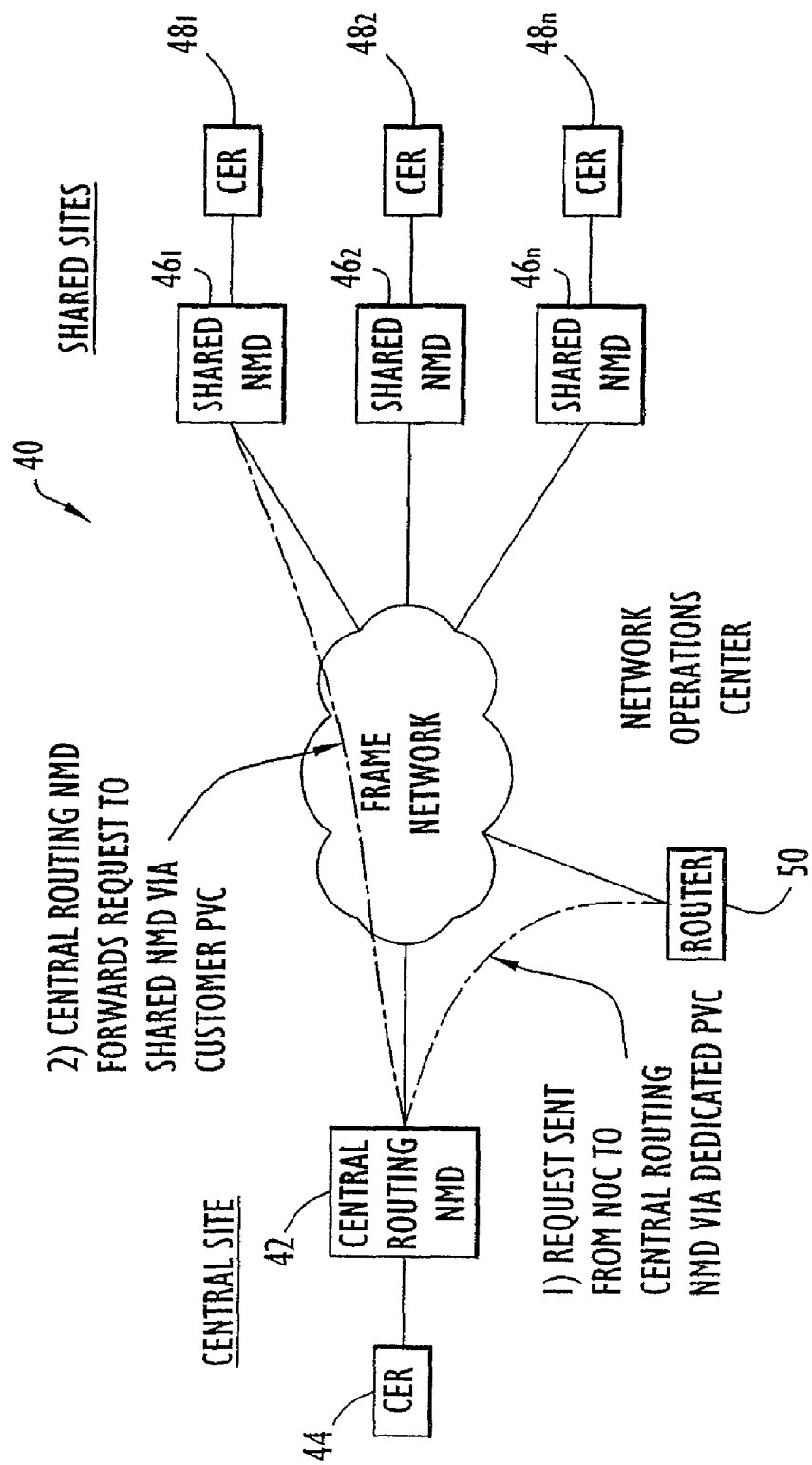
FIG. 2 is a system-level block diagram illustrating implementation of a management traffic consolidation scheme employing permanent virtual circuits (PVCs) suitable in a frame relay or ATM based networks.

FIG. 2 illustrates how the concept of management traffic consolidation can be implemented in such a system architecture. The system 40 includes a network operations center, a central site, and a number of remote sites, which communicate over a Frame Network. The central site includes, among other things, a gateway network management device 42 located in the path between a customer edge router (CER) 44 and the network. Likewise, each of the remote sites includes a remote NMD $46_i$ located in a path between a customer edge router $48_i$ and the network. The network operations center is coupled to the network via a router 50 or the like. At least some of the system controller capabilities of a backend system are resident at the Network Operations Center in this example, and management messages destine for the NMDs originate from the Network Operations Center.

In this architecture, the gateway NMD 42 accepts management traffic from the Network Operations Center via a dedicated PVC or LAN port. This management traffic, for example, may be bound for one of the remote NMDs $46_i$. The gateway NMD identifies the target remote NMD (e.g., remote NMD $46_1$) and forwards the management traffic to the target NMD via data PVC using layer-2 SLA encapsulation.

In this scheme, the remote NMDs $46_i$ periodically send "registration" messages to the gateway NMD 42. The gateway NMD 42 uses these registration messages to build up an internal routing table. This table maps remote NMDs to PVCs. Thus, when the gateway NMD 42 receives a management message destined for a remote NMD $46_i$, the gateway NMD 42 simply looks up the appropriate PVC from the table, and then sends the message on that PVC using GRE encapsulation. The GRE encapsulation is used so that the remote NMD $46_i$ will be able to differentiate management traffic from customer traffic.

As described below, this concept from the Frame Relay environment can be applied to the MPLS/IP transport environment. Service providers and LECs need to use two IP address spaces in each enterprise customer network. One is the actual customer address space. The second is the network management device management address space. Given access to a head-end network management device via a provisioned PVC (for Frame Relay or ATM access) or IP based Inband, one then needs to be able to piggyback on the enterprise's network connectivity to communicate with remote sites. This results in much less cost and time needed to configure and maintain management connectivity to network management devices and may result in many new enterprise rollouts where hesitations exist today.

This head-end functionality (called "routing" in Frame Relay MTC) and remote functionality (called "shared" in Frame Relay MTC) must exist on all varieties of network management devices used in the network.

While Ethernet NMDs that sit behind a router must use the enterprise's address space (and not a management address space), the same type of access and provisioning issues will hinder their rollout by service providers and LECs. By applying this concept to the Ethernet network management devices, many of the barriers to providing Ethernet network management devices as part of a service provider or LEC offering are eliminated.

The concept of management traffic consolidation (MTC) can be applied in a pure IP environment by employing an encapsulated addressing scheme. In the IP environment, there are no data PVCs connecting the gateway NMD to the remote NMDs. Instead, the gateway NMD builds up a table which maps network management device IP addresses to customer IP addresses.

To best understand this concept, realize that two separate IP spaces are involved; the end customer's IP space and the network operation center's management IP space. The backend processing system addresses NMDs using addresses within the network operation center's management space. The table located in the gateway NMD basically maps the remote network management device addresses (in the network operation center space) to the customer address space.

Figure 3:
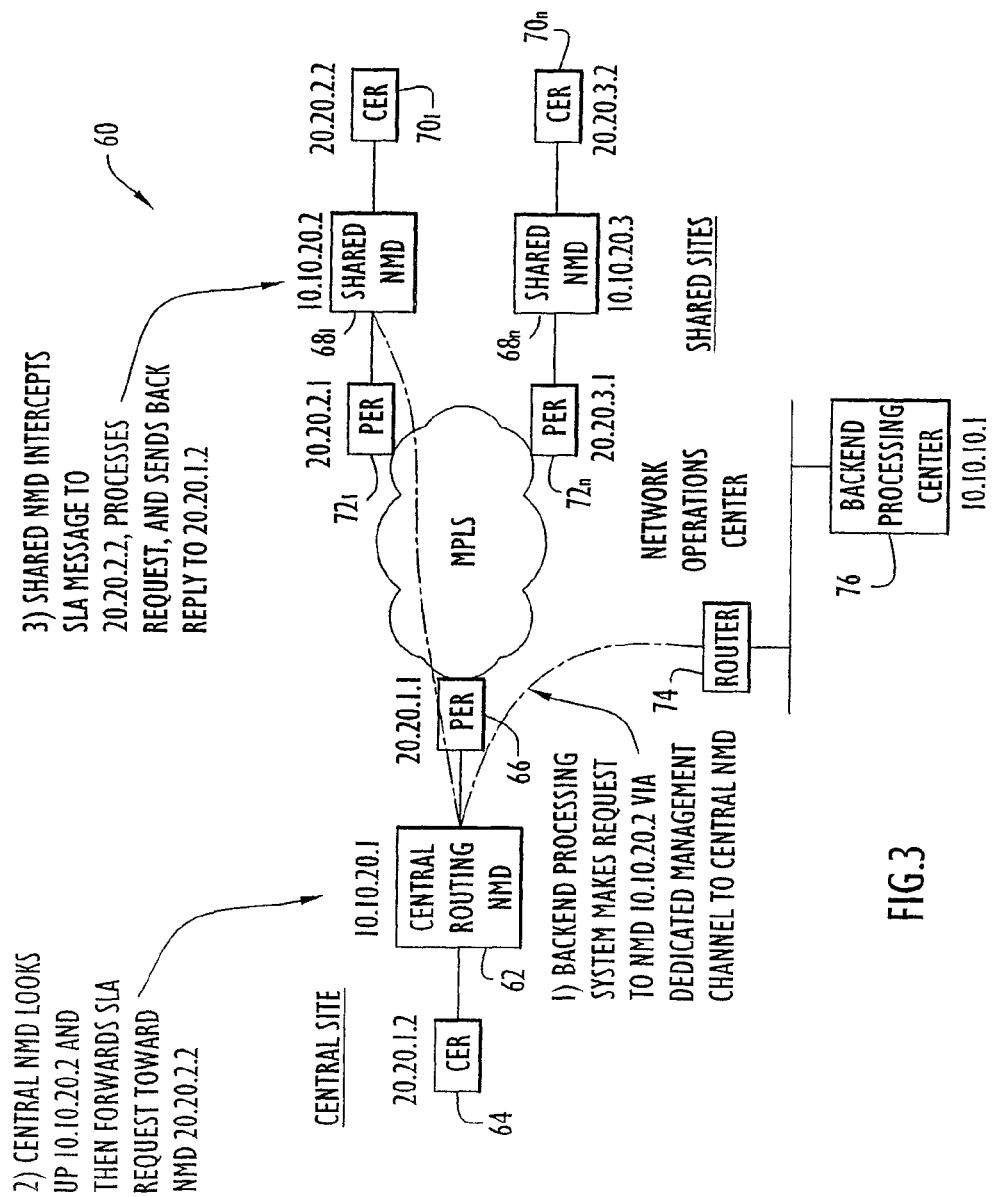
FIG. 3 is a system-level block diagram illustrating implementation of a management traffic consolidation scheme in an IP environment.

An example of a system architecture for implementing management traffic consolidation in an MPLS/IP transport environment is shown in FIG. 3. The system 60 includes a network operations center, a central site, and a number of remote sites, which communicate over an MPLS-based network. The central site includes, among other things, a gateway network management device 62 located in the path between a customer edge router (CER) 64 and a provider edge router (PER) 66. Likewise, each of the remote sites includes a remote network management device $68_i$ located in a path between a customer edge router $70_i$ and a provider edge router $72_i$. The network operations center is coupled to the network via a router 74 or the like. At least some of the system controller capabilities of a backend system 76 are resident at the Network Operations Center in this example, and management messages destine for the network management devices originate from the Network Operations Center.

As used herein, the term "gateway NMD," denotes that this NMD serves as a routing hub for distributing management traffic in a consolidated manner from a backend controller to a number of other NMDs.

While backend processing system 76 may include a variety of functions associated with operating the overall network management system (as indicated in FIG. 1), for simplicity, the backend processing system 76 will be referred to herein as the management controller or simply controller, since the functionality described herein relates principally to controlling and communicating with NMDs throughout the network, generating network management messages destined for the NMDs, and receiving management messages from the NMDs.

Each of the routers and NMDs has an associated IP address. For example, as shown in FIG. 3, gateway NMD 62 has an IP address 10.10.20.1, remote NMD $68_1$ has an IP address 10.10.20.2, and remote NMD $68_n$ has an IP address 10.10.20.3. Likewise, CER 64 at the central site has an IP address 20.20.1.2, CER $70_1$ has an IP address 20.20.2.2, and CER $70_n$ has an IP address 20.20.3.2. PER 66 at the central site has an IP address 20.20.1.1, PER $72_1$ has an IP address 20.20.2.1, and PER $72_n$ has an IP address 20.20.3.1.

The IP addresses of the network management equipment, including the NMDs and the network management controller, are management IP addresses that exist within the management IP space. In other words, these are IP addresses that are meaningful to and understood and processed by the network management equipment. The IP addresses of the routers and other customer equipment in the network, including the CERs and PERs, are customer IP addresses that exist in the customer's IP space. That is, these addresses lie in the customer's address range and can be used to route message to various destinations via the MPLS-based network.

These customer IP addresses can be used as "piggyback" addresses for delivering network management messages between the controller at the network operations center and remote NMDs throughout the network. The gateway NMD maintains a table that essentially maps management IP addresses (which can be designated by the backend system) to piggyback customer IP addresses. Each remotely-located remote NMD is responsible for adding itself to this table by using a simple registration protocol.

For example, when a remote NMD is installed and configured for management traffic consolidation (MTC) operation, the following items can be entered by the installer: the NMD's management IP address (as entered in the backend processing system); the NMD's piggyback address (which is the same as the NMD's SLA address, as further explained below); the gateway NMD's piggyback customer IP address; and, optionally, a backup gateway NMD's piggyback customer IP address (for redundancy).

Once this information is entered, the remote NMD sends an encapsulated "Registration" message to the gateway NMD. The gateway NMD will then use the information contained within the message to add the appropriate entry to its route table, and send back a "Registration Confirm" message. In this case, the remotely-located remote NMD needs to periodically re-register with the gateway NMD (e.g., every 15 minutes). This allows the gateway NMD to rebuild its table after a restart.

The table located on the gateway NMD can be viewable via an administrative interface. An administrative provision can also be made to add/modify entries. The following table illustrates the typical contents of the route table.

| Management Address | Piggyback Address | Layer 2 PVC |
|---|---|---|
| 10.10.20.2 | 20.20.2.2 | 100 |
| 10.10.20.3 | 20.20.3.2 | 100 |
| 10.10.20.17 | 20.20.243.7 | 200 |

The first column lists the management IP addresses for each NMD that is to communication with the controller. These addresses exist in the network operation center's management domain. The second column lists the piggyback target address that is used to encapsulate the management traffic to the desired NMD. The piggyback addresses exist in the customer's address range, as previously noted. The third column lists any Layer 2 specific connection information, such as ATM VPI/VCI, Frame Relay PVC, Ethernet VLAN, MLPS tags, etc. . . . (if present), which is determined during registration message reception. This ensures that the encapsulated message is sent back on the correct Layer 2 connection.

In the architecture shown in FIG. 3, the gateway NMD 62 accepts management traffic from the network operations center via a management channel, which can be a dedicated management channel, for example. This management traffic, for example, may be bound for one of the remote NMDs $68_j$. As indicated in FIG. 3, the gateway NMD 62 accepts management requests from the network operations center, performs an address translation lookup, encapsulates each request, and then sends the messages to the desired destination using a co-located piggyback customer address (for example, the customer IP address of the CE router that is in line with the destination remote NMD). The remote NMD $68_j$ sends back a response using that same encapsulation, which is then un-encapsulated by the gateway NMD 62.

Figure 4:
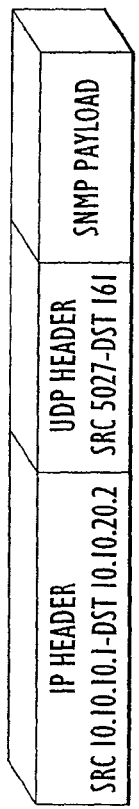
FIG. 4 is a data structure of an exemplary management request message embodied in an SNMP packet for transmission from a network controller to a gateway network management device over a management channel.

An example of a message format for a management request message originating from the controller 76 in the form of a simple network management protocol (SNMP) packet is shown in FIG. 4. In this example, the SNMP packet forming the management request message is ultimately destined for one of the remote NMDs, in particular, remote NMD $68_1$. The SNMP packet includes at least three fields: an IP header 80, a user datagram protocol (UDP) header 82, and an SNMP payload 84. The IP header 80 includes the management IP address of the source of the message (in this case, 10.10.10.1, which is the management IP address of the controller 76) and the management IP address of the destination NMD (in this case, 10.10.20.2, which is the management IP address of remote NMD $68_1$). The UDP header 82 includes the UDP source port (in this case, 5027) and the UDP destination port (in this case, 161).

The management request message is supplied via router 74 from the controller 76 at the network operations center to the gateway NMD 62 at the central site over the dedicated management channel. The gateway NMD 62 encapsulates the management request message inside a Transport Packet that can be routed through the MPLS network. Thus an SNMP packet leaving the controller in the format shown in FIG. 4 arrives at the target remote NMD $68_1$ in the format shown in FIG. 5. Specifically, the packet encapsulating the management request message essentially includes two portions, an Internet Protocol Management Traffic Consolidation (IPMTC) portion and the encapsulated SNMP packet that constitute the original management request message. The IPMTC portion includes at least three fields: an IP header, a Transport header, and an IPMTC header. The encapsulated SNMP packet includes the three fields of the original management request message (i.e., the IP header, the UDP header, and the SNMP).

Figure 5:
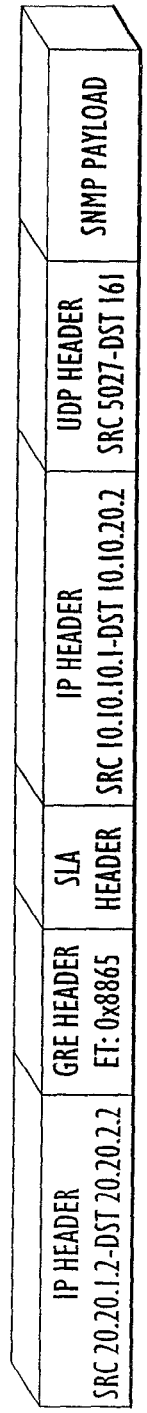
FIG. 5 is a data structure of an exemplary encapsulated management request message suitable for transmission over an IP network using piggyback IP addressing.

The IP header of the IPMTC portion of the GRE-based transport packet shown in FIG. 5 includes the source piggyback customer IP address and the destination piggyback customer IP address. Specifically, the source piggyback customer IP address in this case is the customer IP address of CER 64 (20.20.1.2), which is co-located with gateway NMD 62 at the central site. The destination piggyback customer address in this case is the customer IP address of CER $70_1$, which is co-located with remote NMD $68_1$. These piggyback addresses are recognizable to the network and can be used to route the Transport packet from the central site to the site of the target remote NMD $68_1$. The transport packet contains a unique signature that allows it to be identified by the NMDs as an encapsulating transport packet.

In operation, upon receiving an SNMP management request message from the network operations center, the gateway NMD identifies the destination management IP address of the target remote NMD $68_1$ within the SNMP packet (in this example, 10.10.20.2) and looks up the corresponding piggyback customer IP address associated with the target remote NMD $68_1$ in a table (in this case the customer address of co-located CER $70_1$, 20.20.2.2), and uses this address to encapsulate the original management request so that the encapsulated message will be routed to CER $70_1$.

Upon arriving at the location of CER $70_1$, remote NMD $68_1$ intercepts the Transport message, strips off the encapsulation, and then processes the SNMP payload. The SNMP payload essentially contains the substance of the message being sent from the controller to the remote NMD and the contents of the message can relate to any of a variety of matters, including but not limited to: instructions for collecting data; requests for forwarding collected data; instructions for configuring or testing the NMD; and/or information regarding routing of messages and/or data.

Figure 6:
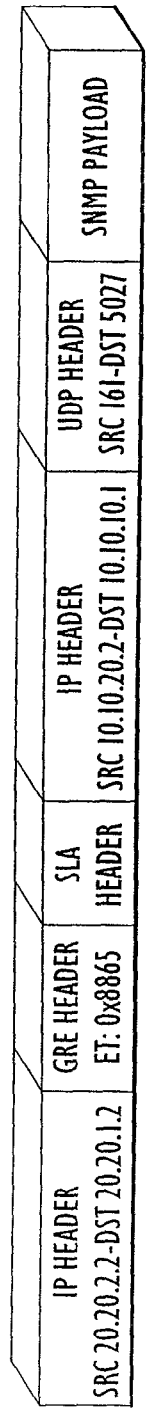
FIG. 6 is a data structure of an exemplary encapsulated reply message suitable for transmission over an IP network using piggyback IP addressing.

After processing the network management message, the remote NMD can reply with a similar encapsulated SNMP response (optionally, a remote NMD can also initiate a message exchange with the management controller). The management controller located at the network operations center is the ultimate destination of this reply message; however, the encapsulation routes the reply message to the location of the gateway NMD, which will then forward the reply message to the network operations center. FIG. 6 shows an example of the structure of an encapsulated reply message generated by the remote NMD. Note that the overall structure of the encapsulated reply message is substantially the same as the encapsulate GRE message sent by the gateway NMD and received by the remote NMD; however, the contents within the fields of the reply message differ. Specifically, the IP header in the IPMTC portion of the encapsulated reply message specifies that the piggyback source address is the customer IP address of CER $70_1$ (which is co-located with the remote NMD $68_1$ that is sending the reply message). The destination piggyback address indicated in the IP header of the IPMTC portion of the encapsulated reply message is the customer IP address of CER 64 co-located with the gateway NMD 62 at the central site.

The encapsulated SNMP packet within the reply message includes an IP header that indicates the source address as the management IP address of the remote NMD $68_1$ (10.10.20.2) and the destination address as the management IP address of the controller 76 (10.10.10.1), i.e., the source and destination addresses are reversed relative the those in the SNMP network management message shown in FIGS. 4 and 5. Likewise, the UDP header within the encapsulated SNMP packet within the reply message include source and destination ports that are reversed relative to the original network management message.

Figure 7:
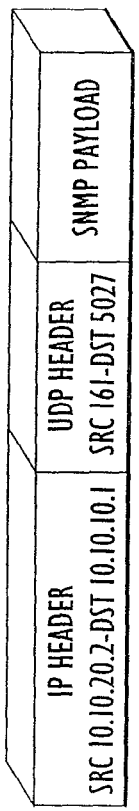
FIG. 7 is a data structure of an exemplary reply message embodied in an SNMP packet for transmission from a gateway network management device to a network controller over a management channel.

Upon arrival of the encapsulated reply message at the central site, the gateway NMD 62 intercepts the encapsulated reply message and strips off the IPMTC portion of the reply message, leaving the SNMP reply message packet, as shown in FIG. 7. The gateway NMD 62 then forwards the SNMP reply message to the controller 76 at the network operations center via the management channel, and controller 76 processes the information in the SNMP payload.

Thus, as can be appreciated from the above example, the IPMTC encapsulated messages that are exchanged between the gateway NMD and the remote NMDs contain two pairs of addresses. One pair is the source/destination addresses within the network operations center (management) address space, and the second pair is the source/destination addresses used within the customer address space. This second pair of addresses is referred to as the piggyback addresses, since management packets ride piggyback on top of these addresses. It will be appreciated that the invention is not limited to the particular message formats illustrated in FIGS. 4-7, and a variety of other formats can be used to encapsulate and "piggyback" management traffic for routing over an IP network.

Figure 8:
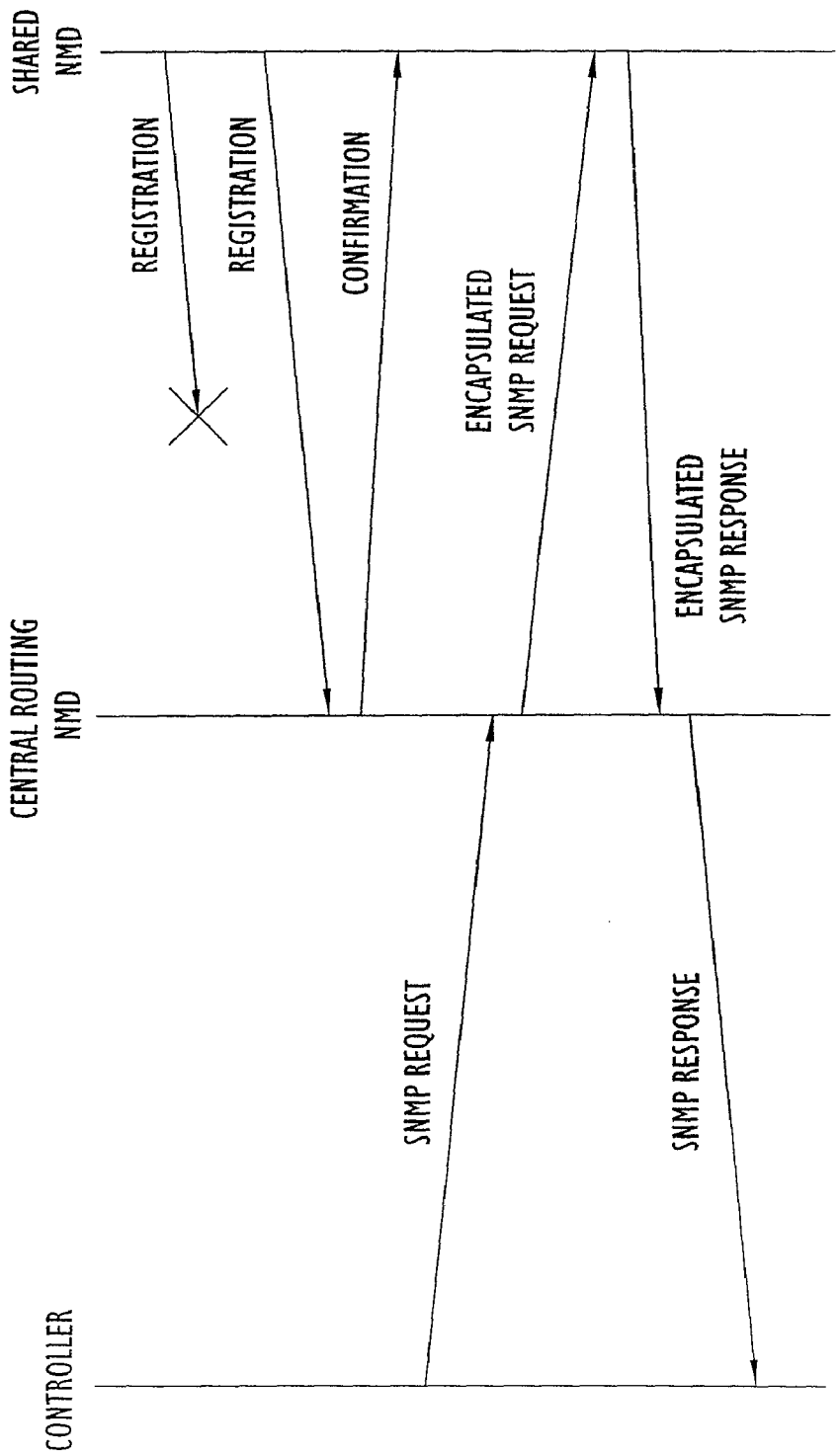
FIG. 8 is a diagram illustrating an exemplary implementation of management traffic consolidation in an IP environment involving transmission of a sequence of messages among a network controller and network management devices.

FIG. 8 illustrates a typical message exchange between the three management traffic consolidation entities described above (i.e., the backend processing system (controller), the gateway NMD, and a remote NMD). Initially, a registration message is sent from the remote NMD to the gateway NMD. It this example, it is shown that the first registration message does not arrive at the gateway NMD. This is actually quite likely after a remote NMD restarts, since network routing tables may not be updated for a few moments after a line disruption. As a result, the remote NMD will repeatedly retry the registration (e.g., at 10 second intervals), until a confirmation is received. Upon receiving the registration message, the gateway NMD sends a confirmation back to the remote NMD. At this point, the registration cycle may repeat periodically (e.g., every fifteen minutes).

FIG. 8 further shows a typical exchange between the controller and the remote NMD via the gateway NMD. In this example, an SNMP exchange is shown, but this could easily be any other type of IP exchange (such at TFTP or Telnet). First, the controller sends an SNMP request message (i.e., a network management message) to the gateway NMD, which SNMP request is bound for the remote NMD. The gateway NMD forwards an encapsulated version of the SNMP request message to the remote NMD using the piggyback customer addresses of equipment co-located with the NMDs. After processing the SNMP request message, the remote NMD sends an encapsulated SNMP response to the gateway NMD, which strips off the encapsulation and forwards the SNMP response message to the controller.

Figure 9:
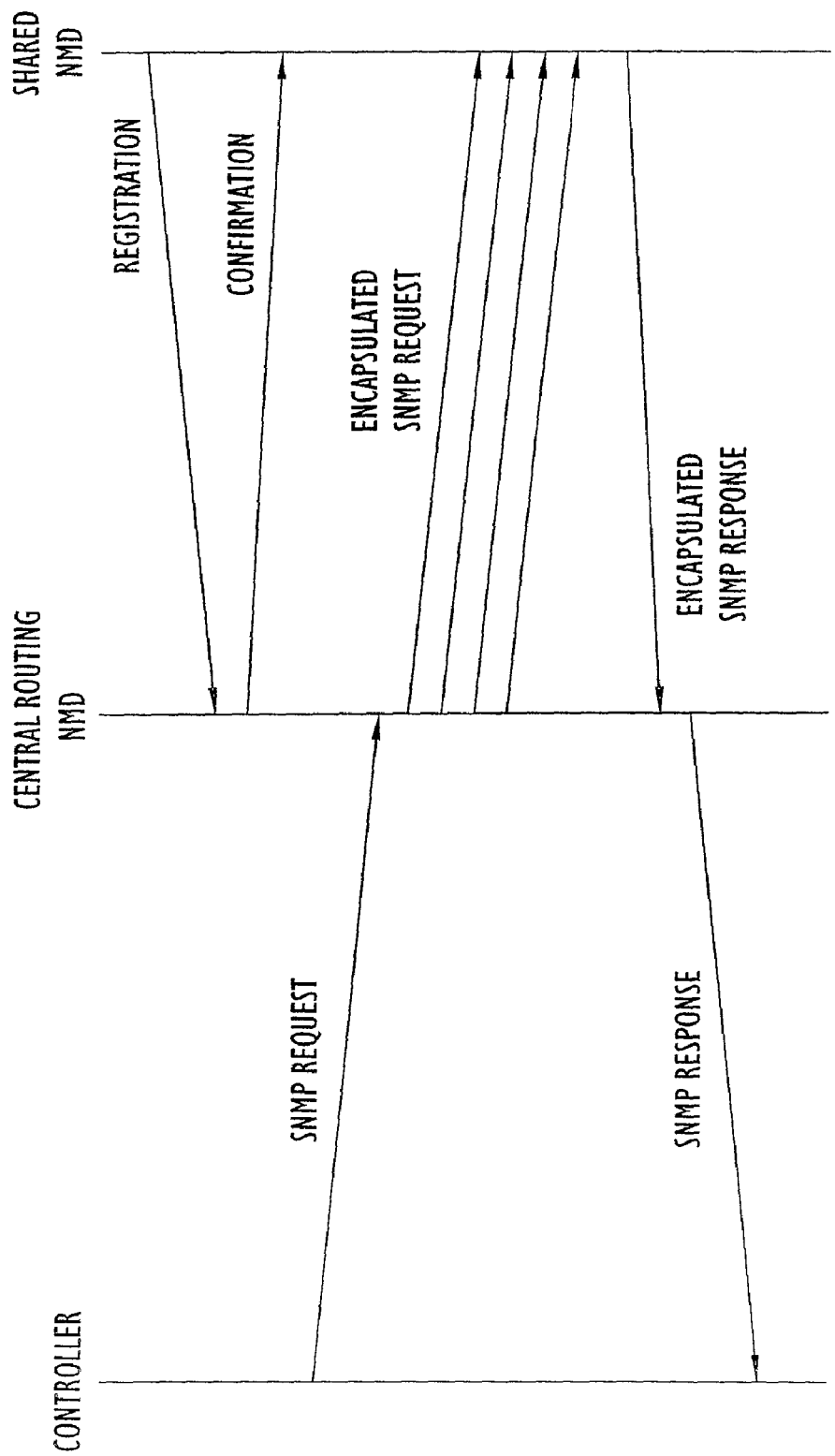
FIG. 9 is a diagram illustrating another exemplary implementation of management traffic consolidation in an IP environment via a sequence of fragmented messages (e.g. using ATM).

FIG. 9 illustrates a signal exchange among a controller, a gateway NMD, and a remote NMD in the case where there are MTU size restrictions between the two NMDs. FIG. 9 differs from FIG. 8 in that a series of encapsulated SNMP request message are sent from the gateway NMD to the remote NMD in order to convey to the remote NMD the full contents of the original SNMP request message generated by the controller. In more general terms, FIG. 9 illustrates that any of a variety of messaging schemes can be used to perform the piggybacking of management request messages using encapsulation within messages that can be routed through the IP network with the use of customer IP addresses assigned to equipment co-located with network management devices.

While the customer IP addresses serving as piggyback addresses in the foregoing example are IP addresses associated with customer edge routers (CERs), the invention is not limited to the use of CER IP addresses as piggyback addresses, and any assigned customer IP address that would result in delivery of encapsulated network management messages to a co-located network management device can used for this purpose.

For purposes of illustrating implementation of management traffic consolidation in an IP environment, a single backend processing system (controller) is shown in FIG. 3 along with a single gateway network management device. However, it will be appreciated that there may be a plurality of controllers and/or network operations centers associated with the network as well as a plurality of gateway network management devices. For example, a controller (or at least some of a plurality of controllers) may route message to remote NMDs via more than one gateway NMD, and a gateway NMD (or at least some of a plurality of gateway NMDs) may receive network management messages destined for remote NMDs from more than one controller. Further, each of the remote NMDs can be configurable such that remote NMDs can be reassigned to different gateway NMDs as needed. Optionally, at least some of the NMDs can be designed to operate as either a gateway NMD or as a remote NMD, such that the NMDs are configurable to serve as either a gateway or remote NMD as necessitated by the network architecture, changing operating conditions or network topology, or equipment malfunctions. This capability further supports redundancy within the network management system, since individual NMDs can be reconfigured on the fly during operation to serve as either a gateway NMD or as a remote NMD to maintain communications between the backend processing system and the NMDs throughout the network.

Having described preferred embodiments of new and improved methods and apparatus for IP management traffic consolidation, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for routing network management messages over a network between components of a network management system that monitors performance of the network, the method comprising:

assigning management addresses to components of the network management system, including a management controller and a plurality of network management devices located at a plurality of sites, the management addresses being distinct from customer addresses associated with equipment located at the plurality of sites;

sending a network management message from the management controller to a gateway network management device, the network management message including a management address of a remote network management device; and sending an encapsulated network management message from the gateway network management device to the remote network management device, the encapsulated network management message containing the network management message and a customer address associated with equipment co-located with the remote network management device, the customer address being used to route the encapsulated network management message through the network, wherein the remote network management device is located in a path between the network and the co-located equipment whose customer address is used to route the encapsulated network management message through the network, and wherein the remote network management device intercepts the encapsulated network management message without the encapsulated network management message reaching the co-located equipment whose customer address is used to route the encapsulated network management message.

2. The method of claim 1, further comprising:
sending an encapsulated network management reply message from the remote network management device to the gateway network management device, the encapsulated network management reply message containing a network management reply message and a customer address associated with network equipment co-located with the gateway network management device, the customer address being used to route the encapsulated network management reply message through the network; and
sending the network management reply message from the gateway network management device to the management controller, the network management reply message including a management address of the management controller.

3. The method of claim 1, further comprising:
maintaining a table at the gateway network management device, the table indicating a correspondence between management addresses of network management devices to which the gateway network management device routes network management messages and customer addresses associated with equipment respectively co-located with the network management devices at said plurality of sites;
wherein the gateway network management device encapsulates a network management message using a customer address that corresponds to a management address contained in the network management message.

4. The method of claim 1, wherein the network includes at least one of an Internet protocol (IP) and a multi protocol label switching (MPLS) transport environment.

5. The method of claim 1, wherein the gateway network management device encapsulates the network management message using Internet Protocol Management Traffic Consolidation (IPMTC) encapsulation.

6. The method of claim 5, wherein the encapsulated network management message is a transport packet encapsulating an IP packet.

7. The method of claim 1, wherein the network management message comprises an IP packet.

8. The method of claim 1, wherein the management addresses are IP addresses associated with a management address space, and the customer addresses are IP addresses associated with a customer address space.

9. The method of claim 1, wherein at least some of the plurality of network management devices are configurable as a gateway network management device.

10. The method of claim 1, wherein the network management message is sent from the management controller to the gateway network management device without encapsulating the network management message in a message containing a customer address.

11. The method of claim 1, wherein the co-located equipment comprises a router, and the remote network management device is arranged between the network and the router.

12. The method of claim 1, wherein the remote network management device is not assigned its own customer address.

13. A method of performing management traffic consolidation in a network, comprising:
conveying network management messages between a management controller and a plurality of network management devices distributed throughout the network by routing the network management messages through a gateway network management device, wherein:
the network management messages sent between the gateway network management device and the plurality of network management devices contain management addresses recognizable to the network management devices and piggyback addresses recognizable to network equipment for routing the network management messages through the network between a location of the gateway network management device and locations of the plurality of network management devices;
the management addresses are IP addresses assigned to components of a network management system, and the piggyback addresses are customer IP addresses assigned to other equipment co-located with the plurality of network management devices; and
the remote network management devices are located in paths between the network and the other co-located equipment whose customer IP addresses are used as the piggyback addresses to route the network management messages through the network, and wherein the network management devices intercept the network management messages without the network management messages reaching the other equipment co-located with the network management devices whose customer IP addresses are used as the piggyback addresses to route the network management messages.

14. The method of claim 13, wherein the network management messages are conveyed over a management channel between the management controller and the gateway network management device without use of the piggyback addresses.

15. The method of claim 13, wherein the other equipment co-located with the network management devices comprise routers, and the network management devices are arranged between the network and the respective routers.

16. The method of claim 13, wherein the network management devices are not assigned their own customer IP addresses.

17. A network management system, comprising:
a plurality of network management devices located at a plurality of sites connected in a network;
a management controller operable to supply network management messages destined for the network management devices and to receive network management messages supplied by the network management devices, wherein a network management message includes management addresses associated with a source and a destination of the network management message; and
a gateway network management device operable to route network management messages between the management controller and the plurality of network management devices, wherein the gateway network management device is configured to receive a network management message from the management controller and to supply an encapsulated network management message containing the network management message and a piggyback address that corresponds to a destination management address contained in the network management message, the piggyback address being useable for routing the encapsulated network management message through the network to a destination network management device, wherein:

the piggyback address is an address assigned to other equipment co-located with the network management devices;

the destination network management device is arranged between the network and the other, co-located equipment whose address is used as the piggyback address to route the encapsulated network management message through the network; and the destination network management device is configured to intercept the encapsulated network management message without the encapsulated network management message reaching the other, co-located equipment.

18. The network management system of claim 17, wherein a network management device sends to the gateway network management device an encapsulated network management message containing: a network management message bound for the management controller, including a destination management address associated with the management controller; and a piggyback address that corresponds to a management address of the gateway network management device; and the gateway network management device removes encapsulation from the network management message and sends the network management message to the management controller.

19. The network management system of claim 17, wherein the gateway network management device includes a table indicating a correspondence between management addresses of network management devices to which the gateway network management device routes network management messages and corresponding piggyback addresses associated with equipment respectively co-located with the network management devices at said plurality of sites.

20. The network management system of claim 17, wherein the network includes at least one of an Internet protocol (IP) and a multi protocol label switching (MPLS) transport environment.

21. The network management system of claim 17, wherein the gateway network management device encapsulates the network management message using Internet Protocol Management Traffic Consolidation (IPMTC) encapsulation.

22. The network management system of claim 21, wherein the encapsulated network management message is a transport packet encapsulating an IP packet.

23. The network management system of claim 17, wherein the network management message comprises an IP packet.

24. The network management system of claim 17, wherein the management addresses are IP addresses associated with a management address space, and the piggyback addresses are customer IP addresses associated with a customer address space.

25. The network management system of claim 17, wherein at least some of the plurality of network management devices are configurable as a gateway network management device.

26. The network management system of claim 17, wherein the management controller sends network management messages to the gateway management device without encapsulating the network management messages in messages containing a piggyback address.

27. The network management system of claim 17, wherein the other, co-located equipment comprises a router, and the destination network management device is arranged between the network and the router.

28. A non-transitory computer readable medium storing instructions, that when executed by a processor, cause the processor to perform functions of:

determining a destination management address contained in a received network management message, the destination management address being assigned to a network management device that is co-located at a destination with other equipment;

identifying a piggyback address corresponding to the destination management address, wherein the piggyback address is assigned to the other equipment co-located with the network management device at the destination; and generating an encapsulated network management message containing the network management message and the piggyback address, the piggyback address being useable for routing the encapsulated network management message through a network to the destination, wherein network management device at the destination is located in a path between the network and the other, co-located equipment whose address is used as the piggyback address to route the encapsulated network management message through the network, and wherein the encapsulated network management message is generated such that the network management device at the destination intercepts the encapsulated network management message without the encapsulated network management message reaching the other, co-located equipment whose address is used as the piggyback addresses to route the encapsulated network management message.

* * * * *

UNITED STATES PATENT AND TRADEMARK OFFICE
CERTIFICATE OF CORRECTION

| | | |
|---|---|---|
| PATENT NO. | : 8,050,268 B2 | Page 1 of 1 |
| APPLICATION NO. | : 11/736370 | |
| DATED | : November 1, 2011 | |
| INVENTOR(S) | : Thomas Kouhsari | |

It is certified that error appears in the above-identified patent and that said Letters Patent is hereby corrected as shown below:

Column 1, line 37, replace "modem IP" with -- modern IP --.

Signed and Sealed this

Thirty-first Day of January, 2012

David J. Kappos
*Director of the United States Patent and Trademark Office*